United States Patent
Wooley et al.

(10) Patent No.: US 7,395,783 B2
(45) Date of Patent: Jul. 8, 2008

(54) WILDLIFE FEEDER

(75) Inventors: Jack Wooley, Shiner, TX (US); Patrick Benes, Shiner, TX (US); Eric Knebel, deceased, late of Victoria TX (US); by Helen Knebel, legal representative, Victoria, TX (US); Linda G. Armstrong, Victoria, TX (US)

(73) Assignee: Kaspar Wire Works, Inc., Shiner, TX (US)

( * ) Notice: Subject to any disclaimer, the term of this patent is extended or adjusted under 35 U.S.C. 154(b) by 84 days.

(21) Appl. No.: 11/092,421

(22) Filed: Mar. 29, 2005

(65) Prior Publication Data

US 2005/0224002 A1 Oct. 13, 2005

Related U.S. Application Data

(60) Provisional application No. 60/560,436, filed on Apr. 8, 2004.

(51) Int. Cl.
*A01K 5/00* (2006.01)

(52) U.S. Cl. ......................... 119/53.5; 119/54

(58) Field of Classification Search ............ 119/51.03, 119/53.5, 57.5, 61.2, 62, 75, 76, 54, 55, 51.01, 119/53; 222/650; D30/121, 133
See application file for complete search history.

(56) References Cited

U.S. PATENT DOCUMENTS

| 2,796,044 | A | * | 6/1957 | Breland | 119/54 |
| 3,204,608 | A | * | 9/1965 | Snitz | 119/54 |
| 3,498,267 | A | * | 3/1970 | Leeming | 119/61.2 |
| 3,537,429 | A | | 11/1970 | Regan | |
| 3,901,191 | A | * | 8/1975 | Smith | 119/51.03 |
| 5,109,798 | A | * | 5/1992 | Impastato et al. | 119/51.03 |
| 5,184,569 | A | * | 2/1993 | Collins | 119/55 |
| 5,329,876 | A | * | 7/1994 | Tracy | 119/51.03 |

FOREIGN PATENT DOCUMENTS

WO  WO 95/18957  7/1995

* cited by examiner

*Primary Examiner*—T. Nguyen
(74) *Attorney, Agent, or Firm*—Jackson Walker, LLP

(57) ABSTRACT

A wildlife feeder is provided, including a wildlife feeder that may be used for squirrels. The wildlife feeder includes a frame and an axle. The axle is rotatably attached to the frame and has a cage wheel and a feed dispensing wheel attached thereto, such that rotation of the cage wheel such as will occur when an animal is running therein, will cause rotation of the feed wheel. The feed wheel is adjacent a container having a container opening, which container contains a multiplicity of food particles gravity fed to the opening. As the feed wheel, which has cutouts therein, rotates, it dispenses particular wildlife feed therefrom.

22 Claims, 8 Drawing Sheets

WILDLIFE FEEDER

This application claims priority from and incorporates by reference provisional patent application Ser. No. 60/560,436, Filed Apr. 8, 2004.

FIELD OF THE INVENTION

A wildlife feeder, more specifically a feeder with a rotating wheel, the rotating wheel adapted to dispense food from a container adjacent thereto.

BACKGROUND OF THE INVENTION

Squirrel feeders and wildlife feeders in general are known in the art. Examples of such wildlife feeders include those described in U.S. Pat. Nos. 3,537,429; 3,638,617; and 4,632,062.

U.S. Pat. No. 3,537,429 discloses an animal and bird feeder in which ears of corn project laterally from a vertical member which is rotatable around the horizontal axis, and is mounted to a tree trunk. Animals, such as squirrels, will stand on a platform mounted on the tree trunk just below the vertical member, typically a disk, having ears of corn projecting therefrom. When the squirrels are finished eating one ear of corn they will reach up and pull down another, causing the disk to rotate.

U.S. Pat. No. 3,638,617 discloses a deer and wild turkey feeder. This patent discloses a granular feed dispenser for animals including a hopper body with a lower downwardly opening outlet and a generally horizontal panel member disposed beneath the outlet. The panel located below the outlet is set on a axle which may be rotated to dispense corn and other feed falling from the hopper body onto the panel.

U.S. Pat. No. 4,632,062 discloses a squirrel feeder which includes a frame mounted perpendicularly to a support bar. The bar is rotatably connected to the frame and the frame is attached to the trunk of a tree. Food items are attached to the end of the bar and a squirrel, running out on the frame and climbing on the support bar to get to the food, will cause the support bar to rotate.

The above-described animal feeders all have some advantages. They are fairly simple to construct. They also require some ingenuity on behalf of the animal to obtain the food.

Applicant, however, has provided, an invention that incorporates some of the simplicity of the foregoing inventions but provides for more action by the animal. It also incorporates interaction of the animal with the feeder to dispense food therefrom. It provides for, in addition to these features, visual entertainment for the viewer as a squirrel, or other animal, works to dispense the food.

More specifically, Applicant provides a vertically mounted rotatable wheel cage with a dispensing apparatus and dispensing container adjacent thereto, which wheel cage, when rotated, as by a squirrel treading on the inner or outer surface thereof, will cause the dispensing apparatus from dispensing food from the dispensing container.

OBJECTS OF THE INVENTION

Therefore, it is an object of the present invention to provide for a simple and easy wildlife feeder, and one which may be adapted for feeding squirrels, and birds, whereby interaction of the animal with the feeder will cause the dispensing of food therefrom.

Further, it is an object of the present invention to provide for an apparatus capable of entertainment provided by the interaction of the animals, for example, squirrels, with the apparatus.

Moreover, it is an object of the present invention to provide a squirrel feeder including a dispenser that will require active engagement of the squirrel to dispense food therefrom.

SUMMARY OF THE INVENTION

The objects set forth above and other objects are provided in a squirrel and wildlife feeder comprising a base having a container frame and a rotatable cage or wheel mounted thereon, the container frame typically with the legs depending therefrom. The container frame holds a vertically mounted container. The container has a base plate at the bottom thereof, the plate having an opening from which squirrel food can be dispensed. Adjacent the opening and in interference therewith is a feed wheel (which engages the rotatable cage) with feed notches cut therein. When the feed wheel notch is disposed below the opening, feed will fall into the opening and, rotation of the feed wheel by rotation of the cage, will allow food from the opening to be dumped onto the base below.

DETAILED DESCRIPTION OF THE PREFERRED EMBODIMENT

Figure 1:
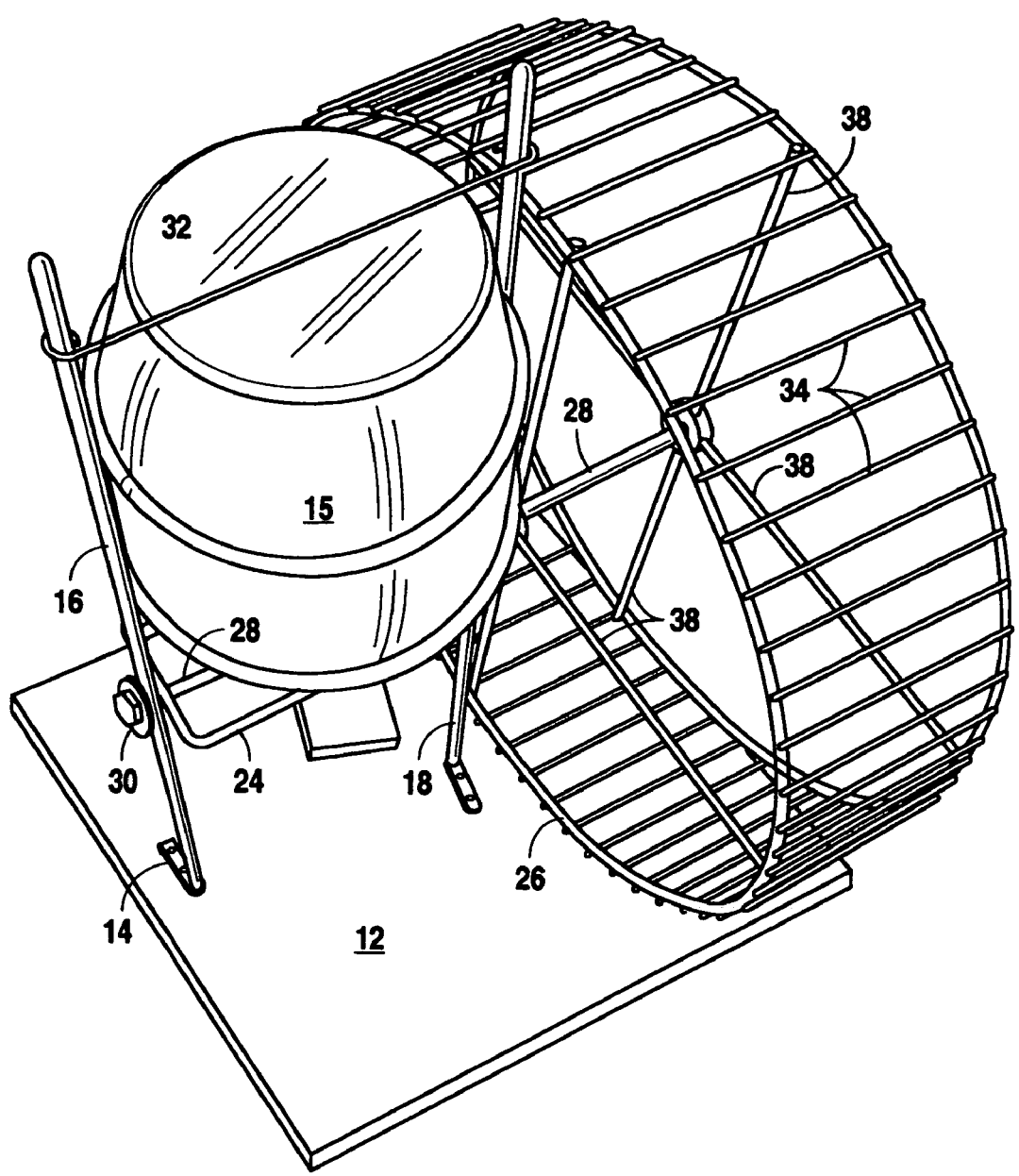
FIG. 1 is a perspective view from the top of Applicant's present invention showing the frame, food container and squirrel wheel.
Figure 2:
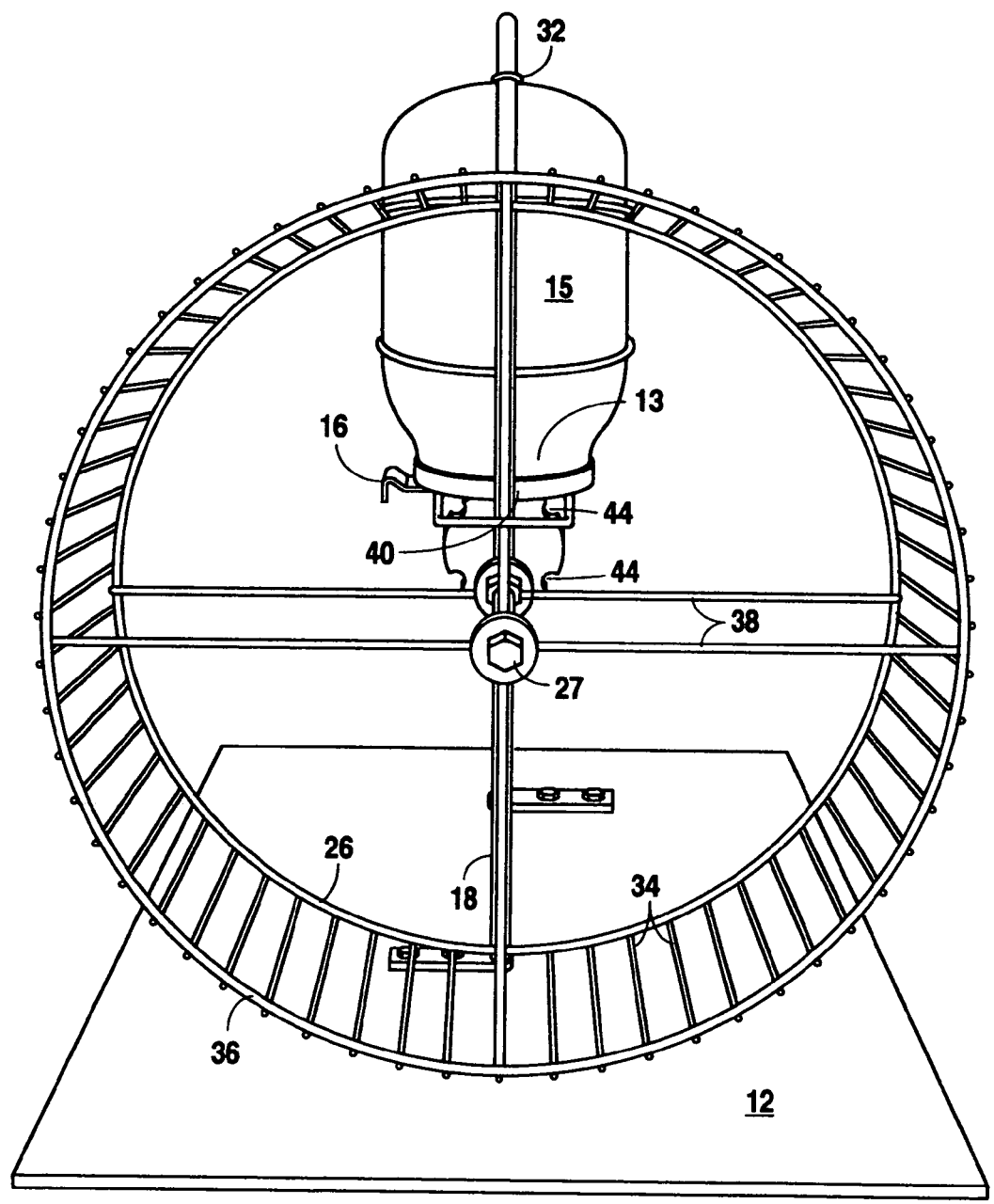
FIG. 2 is a side view of Applicant's present invention showing the food container, squirrel wheel and frame and illustrating the manner in which the wheel is mounted articulates on the frame on an axle.
Figure 3:
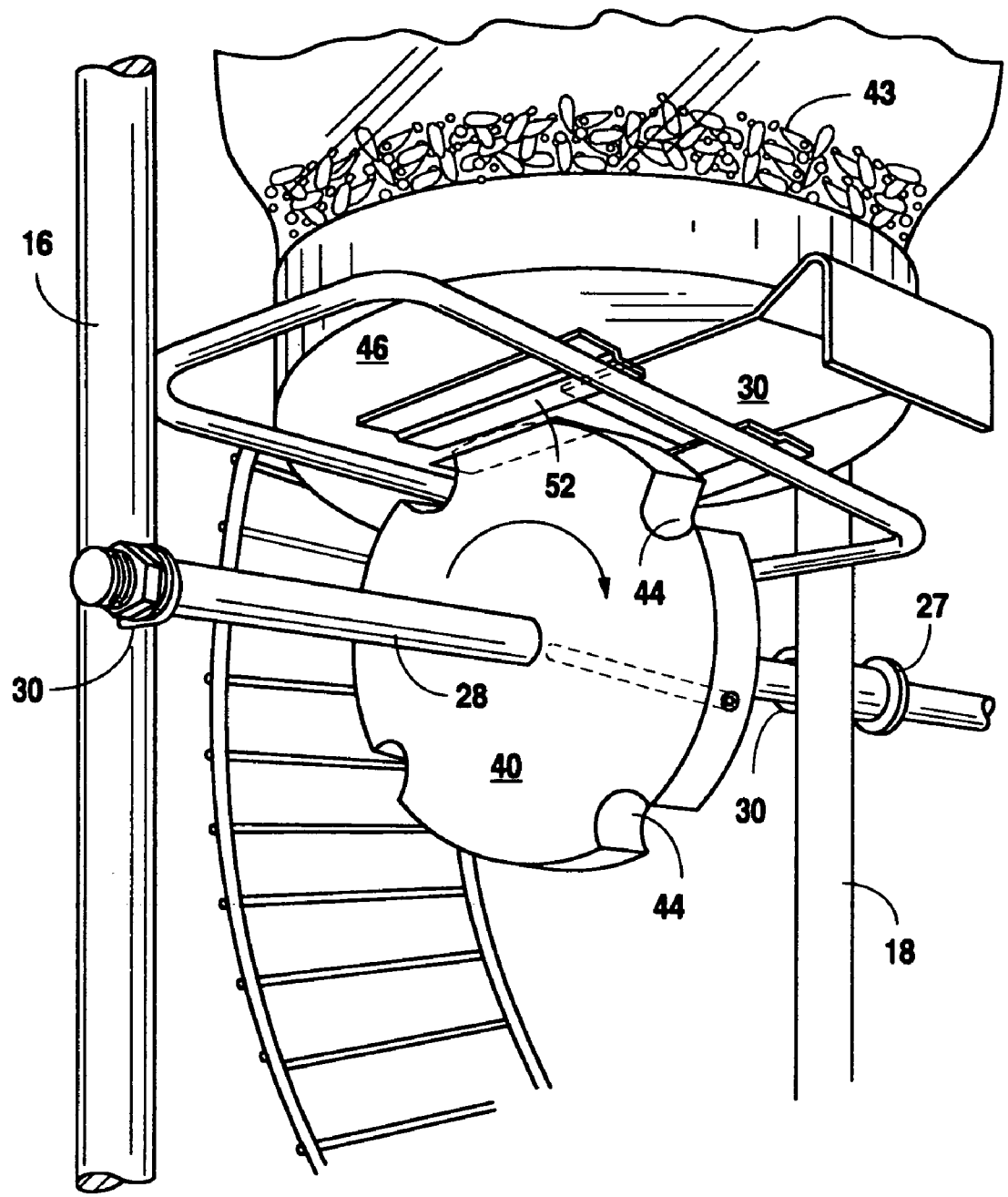
FIG. 3 is a close up perspective view of the manner in which the feed wheel engages the base of the container to dispense food from an opening in the base of the container.
Figure 4:
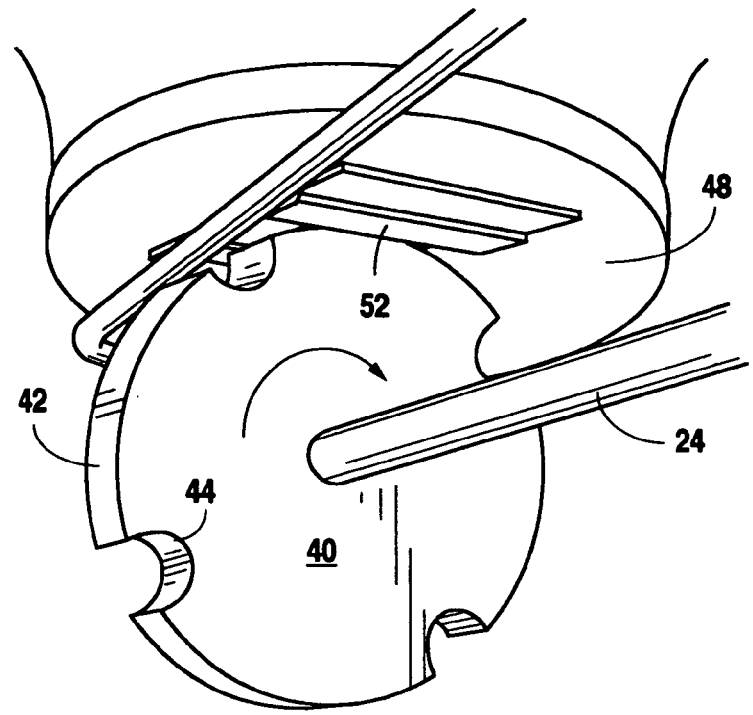
FIG. 4 is another detailed view in perspective showing the manner in which the feed wheel rotates with respect to the opening in the bottom of the feed container for dispensing feed therefrom.
Figure 5:
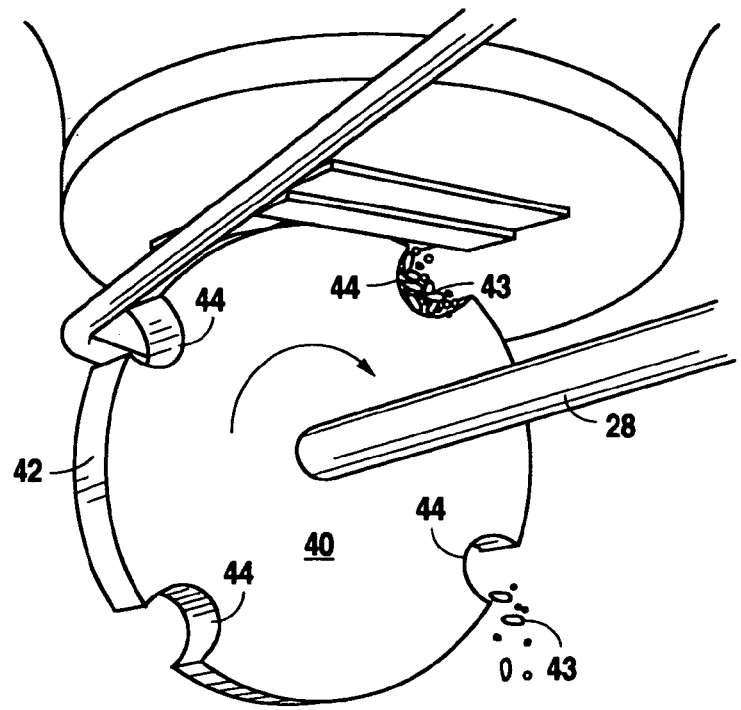
FIG. 5 is yet another close up of the feed wheel showing cutouts therein, and showing feed in the cutouts.

Reference is made to FIGS. 1-7. FIGS. 1-7 illustrate a wildlife feeder, including a squirrel feeder 10 having a base 12. Base 12 is typically a rectangular sheet of wood, for example, a sheet of treated or outdoor plywood approximately 16"×20"×½". Mounted to base 12 is a frame 14 designed to hold a container 15 as well as a squirrel cage wheel 26. Frame 14 is typically comprised of a multiplicity of mild steel members and may be powder coated. Frame 14 may include vertical support legs 16 and 18, the removed ends which are mounted to base 12. Container 15 is designed to contain animal food, for example, squirrel food. Frame 14 is also seen to include circular container retainer bands 20 (upper) and 22 (lower) which will help maintain container 15 in vertical alignment with respect to base 12. A container support base 24, here a generally rectangular structure comprising metal rods is attached on its outer edges to support legs 16 and 18 and is seen to provide support upon which container 15 may rest, as set forth in more detail below. Frame 14 also functions to rotatably mount an axle 28 on a pair of axle support stubs 30 (see FIG. 3). Axle 28 will rotate with respect to the frame. Axle 28 may be stainless steel or made from other suitable, durable, rust resistant material Axle 28 has, rigidly mounted thereto, a squirrel cage wheel 26 and a feed wheel 40.

Squirrel cage wheel 26 is comprised of a pair of axle support collars 27 that rigidly mount squirrel cage wheel 26 to axle 28. Extending radially outward from axle support collars 27 are wheel cross arms 38, here four cross arms coming radially off each of the two axle support collars to support a pair of wheel rims 26, which wheel rims are connected by a multiplicity of wheel tread bars 34. Thus, squirrel cage wheel 26 is rigidly mounted to axle support collars 27 and plenty of access is provided between wheel cross arms 38 to allow a squirrel or other small rodent to climb into the cylindrical squirrel wheel structure and tread on the wheel tread bars 34 to impart rotary motion to axle 28.

Rotating axle 28 will cause feed wheel 40 to rotate. Reference is made especially to FIGS. 3-6B to illustrate the unique structure of feed wheel 40. Feed wheel 40 is typically disk shaped and rigidly mounted to axle 28 to rotate in a plane parallel to and spaced apart from the plane of rotation of squirrel wheel 26. Reference to feed wheel 40 discloses a feed wheel rim 42 that includes a multiplicity of spaced apart feed wheel food dispensing cutouts 44.

Keeping this structure in mind turn to a feed supporting container base 46. Container base 46 is seen to comprise a plane horizontal member which supports, on the interior surface of the container base, a mass of particulate animal feed 43. A rectangular feed opening 48 is provided in the horizontal, feed supporting container base 46, shown in dotted lines in FIG. 3. A sliding cover 50 held by slide cover brackets 52, the brackets mounted to container base 46, is provided. Sliding cover 50 can move between a position which completely blocks feed opening 48 or, when sliding cover 50 is partially or fully retracted uncovers feed opening 48 so feed can drop therethrough (see also FIG. 6C and FIG. 6G).

However, it is seen that when sliding cover 50 is partially or completely open, feed wheel 40 may be in a position that either blocks the opening and therefore prevents feed from coming out therefrom, or if, feed wheel is in a position in which feed wheel cutout 44 is beneath the partial opening in container base 46, feed will fall in to the cut out. Thus, as the wheel is rotated in the direction of the arrows for example, as indicated in FIGS. 3-6A, a rotating feed wheel will alternately block feed dispensing opening 48 in container base 46 while periodically presenting feed wheel cutouts 44 adjacent to the opening for receipt of feed therein. Further, as the wheel rotates and cutouts, containing food, rotate with the wheel, the feed is dispensed onto base 12 and becomes accessible to the squirrel and birds. Note that the width of feed wheel rim 42 would approximate the width of feed opening 48 (see FIG. 6).

One other feature of Applicant's invention may be appreciated with respect to FIG. 1 which shows a bias bar 32 such as a rod made of spring steel which is pivotally mounted to one of legs 16/18 near the top thereof and which may swing away to allow container 15 with feed 43 therein to be inverted, placed upside down with container base 46 resting against container support base 24 within container bands 20 and 22. Bias bar 32 may then pivotally rotate back into position where it presses against the upturned surface of the container body, urging the container downward such that contact may be maintained between part of feed wheel 42 and container base 46.

Applicant has also found that squirrels love shelled pecans. The squirrels may be trained to rotate the squirrel wheel by tying a pecan onto the tread bars of the wheel either on the outside of the wheel or on the inside of the wheel. Squirrels will then reach up in an attempt to get the pecan and cause the wheel to rotate. They will then learn that the rotation of the wheel will not only obtain for them the pecan meat but will also dispense feed from the container. After a few times, the squirrels will rotate the wheel without a pecan on it as they have learned that the rotation itself will produce food even if there is no pecan on the wheel.

Bird feed may be mixed with the squirrel food. The squirrel food typically is comprised of sunflower seeds. About five pounds of sunflower seeds may be mixed with about one pound of ordinary bird seed (millet and maize). By mixing the sunflower seeds and the bird seed (which the squirrels do not favor) some bird seed is dispensed to bring birds around the feeder to provide further entertainment and food for the birds.

Thus, the structure and function of Applicant's novel squirrel feeder 10 is provided. It is seen that a squirrel may enter squirrel wheel 26 and run vigorously thereby generating a deposit of squirrel feed 43 on the base. Moreover, it is seen that container base 46 may be in the nature of a lid that can be screwed from the container body (for example, a glass jar) which can be filled with squirrel feed. Further, sliding cover 50 may be selectively placed in a position that would fully occlude feed opening 48 and prevent feed from dispensing thereof to the disappointment of the wheel turning squirrels.

Figure 6A:
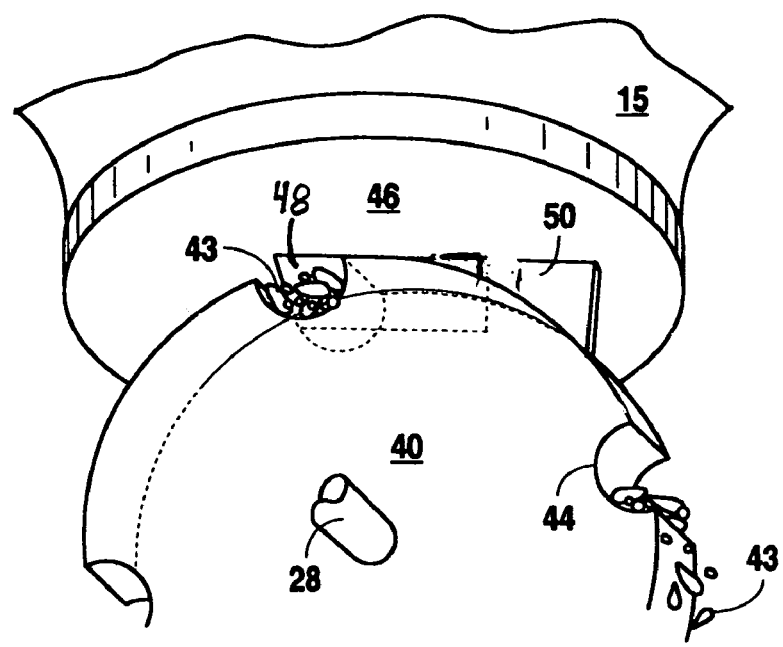
FIG. 6A is an illustration, in perspective, of the manner in which the feed wheel engages an opening in the base of the feed container.
Figure 6B:
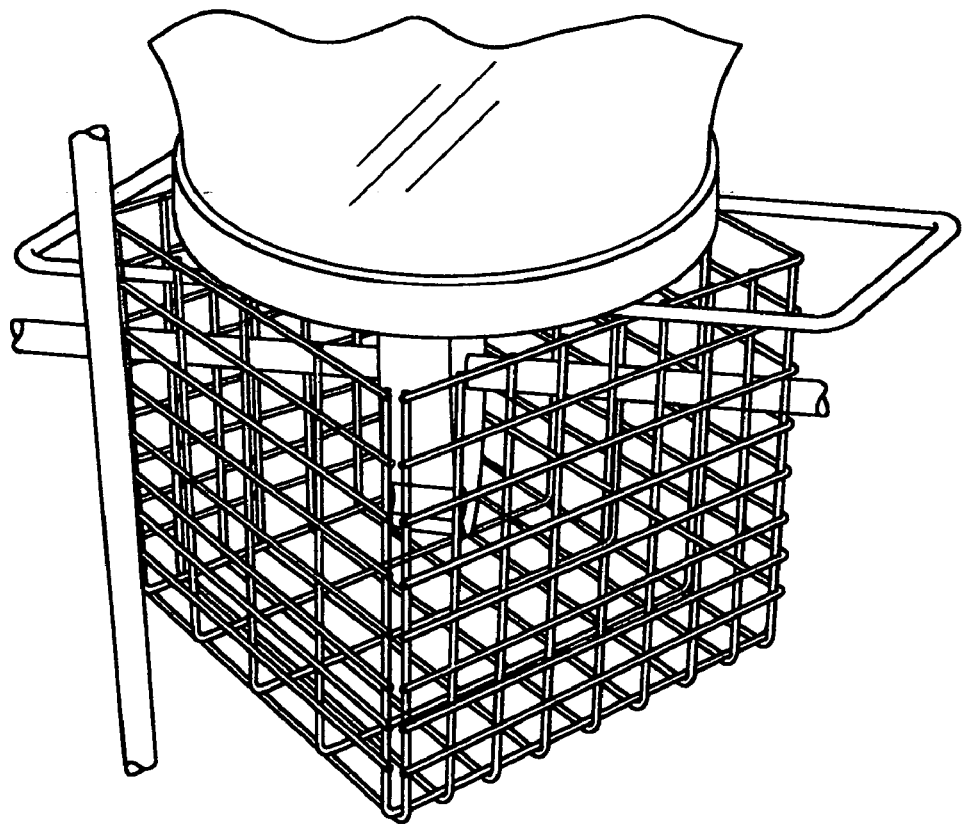
FIG. 6B illustrates, in perspective view, a protective feed wheel mesh cover.

FIG. 6B illustrates a feed wheel mesh cover which may engage container support base 24 to prevent access by the squirrel or other rodent to the feed wheel and container base. Some animals may gnaw on the feed wheel, for example when a plastic feed wheel is used—or the more clever animals may attempt to manipulate the slide to bypass the wheel—or may even attempt to rotate the feed wheel itself in order to obtain the food within the container.

Figure 6C:
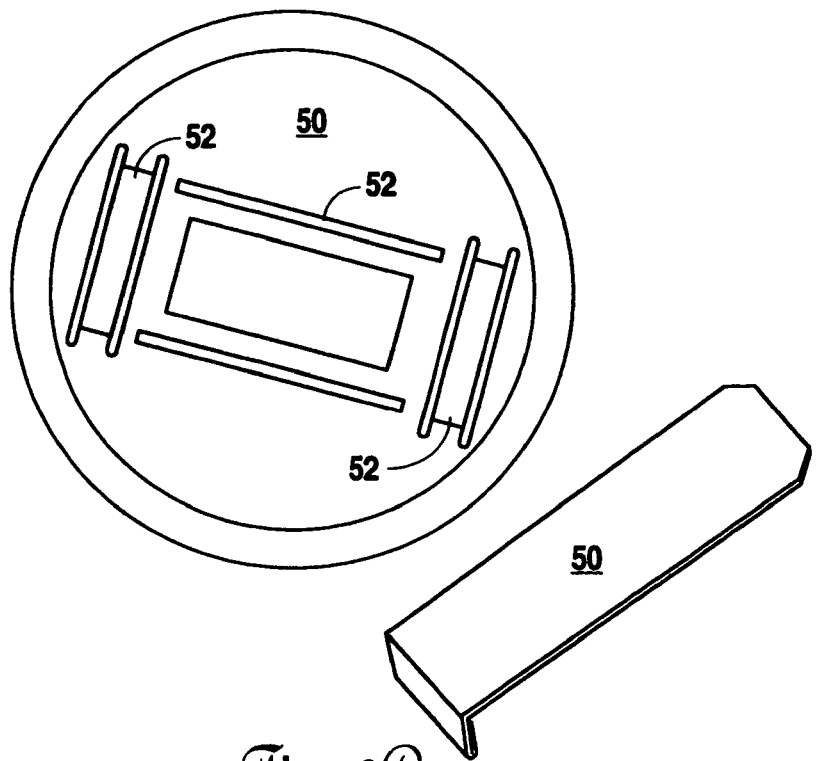
FIG. 6C illustrates, in perspective, the container base, sliding cover and cover brackets.

FIG. 6C illustrates a container base 46 with a sliding cover 50. For clarity, the sliding cover 50 is seen detached from the container base 46. In use, of course, the sliding cover will engage the container base here, by engagement with slide cover brackets 52.

Figure 6D:
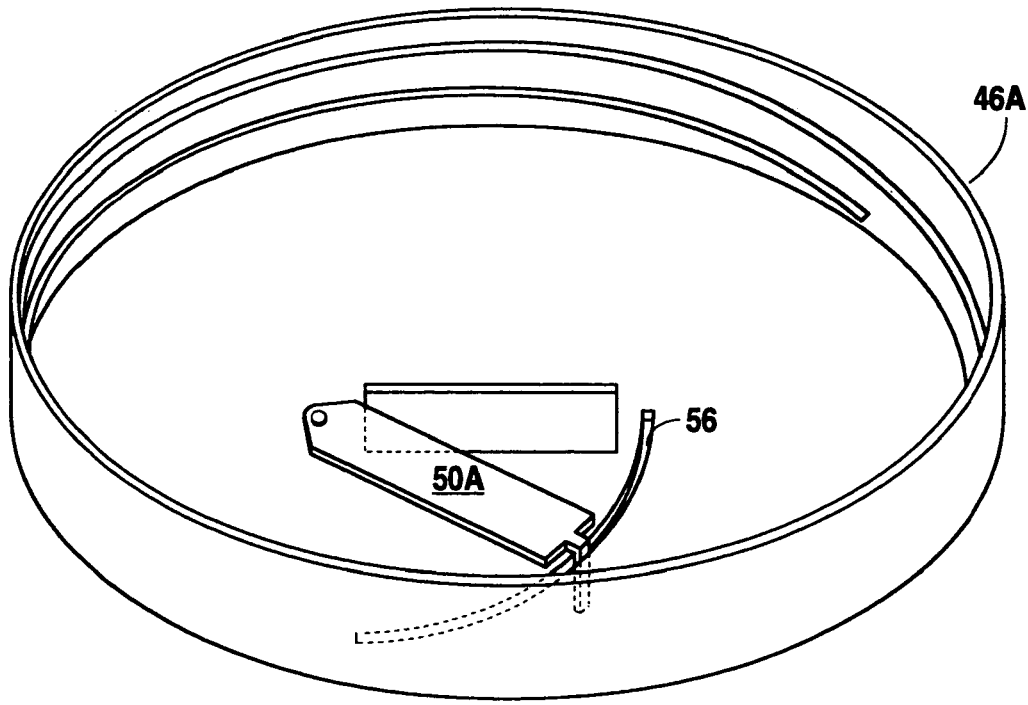
FIGS. 6D and 6E illustrates an alternate preferred embodiment in perspective view of the container base and pivoting cover.
Figure 6E:
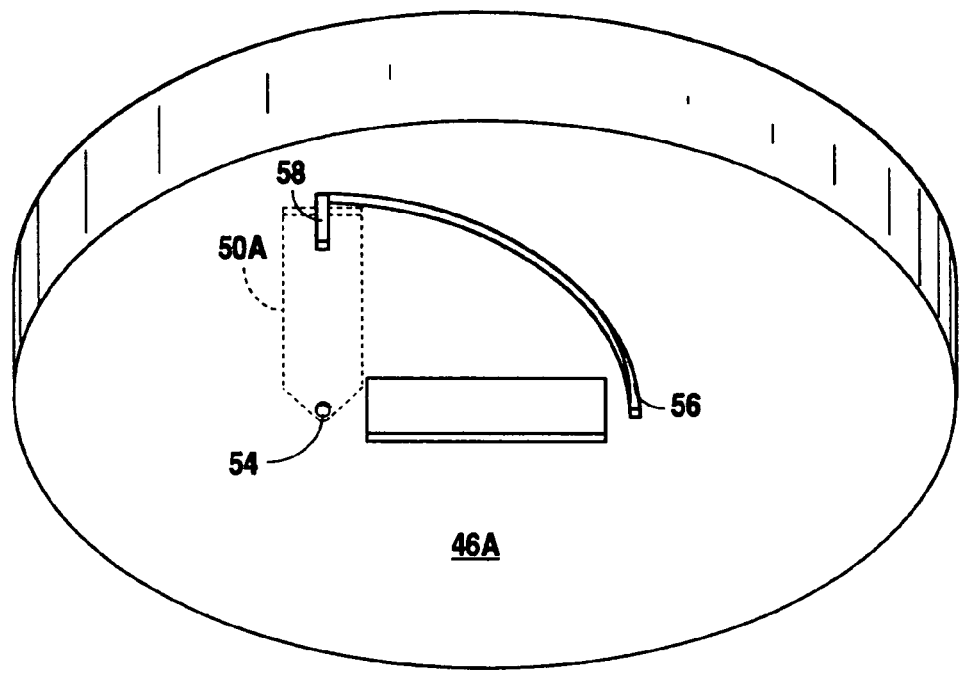
Figure 6F:
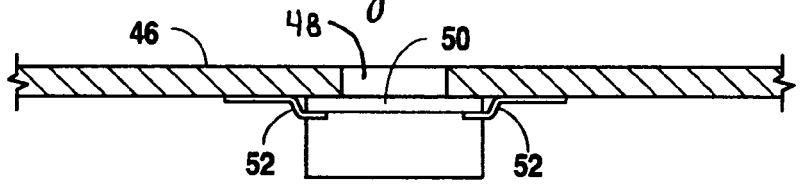
FIG. 6F illustrates in a cutaway side elevational view the sliding cover as it engages the slide.
Figure 6G:
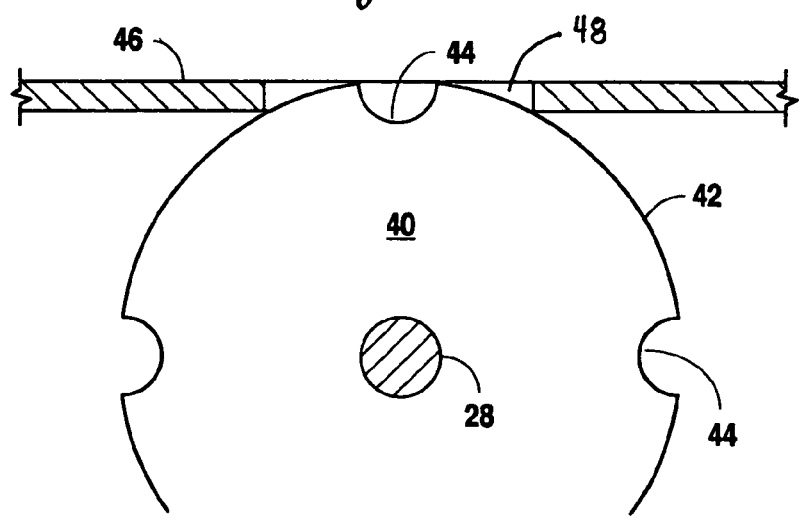
FIG. 6G illustrates in a cutaway side elevational view the manner in which the feed wheel engages the opening.

FIGS. 6D and 6E illustrate an alternate preferred embodiment of a container base 46A, here with a pivoting cover 50A for covering the opening in the base 46A. Pivoting cover 50A is fastened to the container base 46A through the use of pivot pin 54. Slot 56 provides an opening for pivoting cover handle 5 8 which depends downward through the slot to provide the user with means to pivot pivoting cover 50A so that it may occlude the cover opening or so that it may avoid it.

In alternate preferred embodiments of Applicant's novel squirrel feeder, a variety of configurations may be provided for the feed container. For example, in the alternate embodiment illustrated, the feed container is a glass container, so that one may view the feed contents thereof, and know for example, when the animal feed is running low. However, other embodiments may be opaque and may take different shapes. For example, a tall cylindrical pipe, such as a PVC pipe, with caps on both ends, may be used. When such a pipe is used, a base cover design similar to that in the illustrated embodiment is used. However, when a cylindrical pipe is open at the removed end, one can simply uncap and add feed to the container without the requirement of removing the container from the frame and removing the base cover.

Further, while the feed wheel, with feed wheel cutouts, is disclosed in the figures set forth above, other designs may be used, whose functions will ultimately block the opening and provide spaces, along the perimeter, for the receipt of and the dispensing of feed as the wheel rotates. For example, instead of cutouts that extend to both sides of the wheel, simply a series of cylindrical voids drilled into the face of the perimeter would also work. In addition, the cage wheel may be of a variety of designs, any of which will allow rotation of the axle by a squirrel either from the inside thereof or from the outside.

The spring at the top of the container in pressing the feed container down against the feed container bracket helps prevent the feed container from shifting and jamming against the opening.

Figure 7:
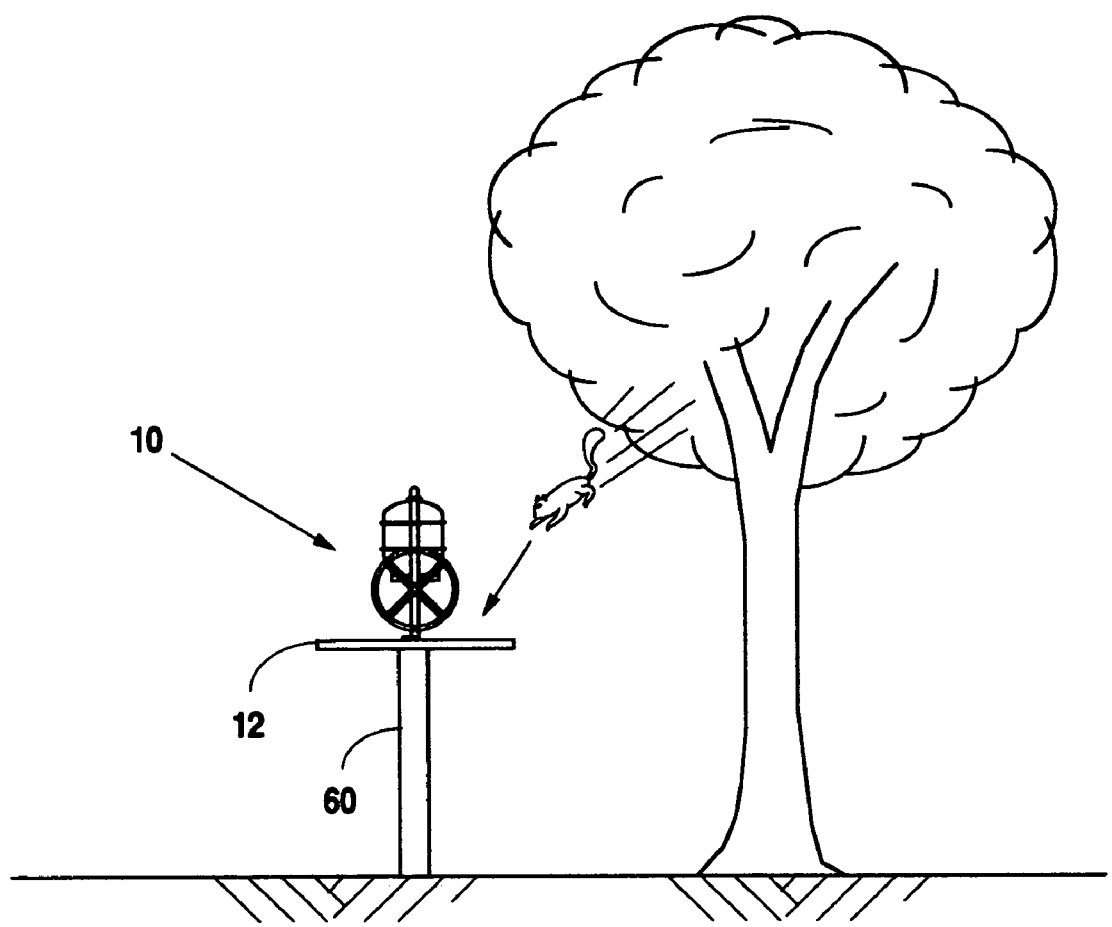
FIG. 7 is a side elevational view of Applicant's novel feeder mounted atop a vertical post adjacent a tree.

FIG. 7 illustrates that Applicant's novel squirrel and bird feeder 10 may be provided with a vertically aligned support post 60, which in turn may be embedded in the ground adjacent a tree. Applicant has found that by such alignment, squirrels often jump from the tree adjacent the feeder to the base.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The invention claimed is:

1. An animal feeder for dispensing particulate feed comprising:
   a frame;
   a fixed axle rotatably mounted to the frame;
   a feed container having a container base, the feed container for engagement with the frame, the container base with a feed dispensing opening;
   a cage wheel mounted to the axle; and
   a feed wheel mounted to the axle and adjacent the feed dispensing opening, the feed
      wheel receives solid, particulate food through the feed dispensing opening in the container base when the cage wheel is rotated by animals running therein;
      wherein the feed wheel includes a multiplicity of cutouts for the receipt of feed thereunto.

2. The animal feeder of claim 1 further comprising a support base, and wherein the frame is mounted to the support base.

3. The animal feeder of claim 1 wherein container base includes a cover dimensioned to at least partially cover the feed dispensing opening.

4. The animal feeder of claim 1 further including a biasing member engaged with the feed container, to provide bias thereto.

5. The animal feeder of claim 4 wherein the biasing member is attached to the frame and may pivot with respect to the frame between a bias and an out-of-bias position.

6. The animal feeder of claim 1 further including wildlife feed for placement into the feed container, and wherein the wildlife feed comprises a mixture of bird feed and squirrel feed.

7. The animal feeder of claim 1 wherein at least some of the frame is powder coated.

8. The animal feeder of claim 1 further including a protective mesh adjacent the feed wheel to prevent access to the feed wheel by wildlife yet to allow feed to pass therethrough.

9. The animal feeder of claim 1 wherein the feed container is at least partly transparent.

10. The animal feeder of claim 1 wherein the feed container is at least partially glass.

11. The animal feeder of claim 1 wherein the feed container is at least partially plastic.

12. The animal feeder of claim 3 wherein the cover is adapted to slide.

13. The animal feeder of claim 3 wherein the cover is adapted to pivot.

14. The animal feeder of claim 1 wherein the feed dispensing opening of the container base is dimensioned to receive the feed wheel therein so as to substantially prevent feed from falling out of the container.

15. The animal feeder of claim 1 wherein the feed dispensing opening of the container base has a width slightly greater than a width of the feed wheel.

16. The animal feeder of claim 1 wherein the frame is adapted to hold the feed container vertical with the container base at the bottom thereof such that gravity will load the cutouts of the feed wheel.

17. The animal feeder of claim 1 further including wildlife feed, wherein the wildlife feed comprises a multiplicity of small particles and wherein the cutouts of the feed wheel are substantially larger than one of the small particles of the multiplicity of small particles.

18. The animal feeder of claim 1 wherein the cage wheel and the feed wheel are spaced apart but parallel to one another.

19. The animal feeder of claim 1 wherein the frame includes feed container support members.

20. The animal feeder of claim 1 further including a protective mesh adjacent the feed wheel to prevent access to the feed wheel by wildlife yet to allow feed to pass therethrough.

21. The animal feeder of claim 1 wherein the frame is adapted to hold the feed container vertical with the container base at the bottom thereof such that gravity will load the cutouts of the feed wheel.

22. The animal feeder of claim 1 further including wildlife feed, wherein the wildlife feed comprises a multiplicity of small particles and wherein the cutouts of the feed wheel are substantially larger than one of the small particles of the multiplicity of small particles.

* * * * *